(12) United States Patent
Liu et al.

(10) Patent No.: US 12,518,351 B2
(45) Date of Patent: Jan. 6, 2026

(54) IMAGE PROCESSING METHOD, IMAGE PROCESSING DEVICE, AND ELECTRONIC DEVICE

(71) Applicant: Rockchip Electronics Co., Ltd., Fuzhou (CN)

(72) Inventors: Mingpei Liu, Fuzhou (CN); Kaihui Huang, Fuzhou (CN); Liudiming Lin, Fuzhou (CN)

(73) Assignee: Rockchip Electronics Co., Ltd., Fuzhou (CN)

( * ) Notice: Subject to any disclaimer, the term of this patent is extended or adjusted under 35 U.S.C. 154(b) by 0 days.

(21) Appl. No.: 18/732,665

(22) Filed: Jun. 4, 2024

(65) Prior Publication Data
US 2024/0428377 A1 Dec. 26, 2024

(30) Foreign Application Priority Data
Jun. 21, 2023 (CN) .......................... 202310744593.1

(51) Int. Cl.
*G06T 5/50* (2006.01)
*G06T 3/40* (2024.01)
*G06T 3/60* (2024.01)
*G06T 7/80* (2017.01)

(52) U.S. Cl.
CPC .............. *G06T 5/50* (2013.01); *G06T 3/40* (2013.01); *G06T 3/60* (2013.01); *G06T 7/80* (2017.01); *G06T 2207/10024* (2013.01); *G06T 2207/20021* (2013.01); *G06T 2207/20132* (2013.01); *G06T 2207/20221* (2013.01)

(58) Field of Classification Search
CPC .... G06T 5/50; G06T 3/40; G06T 3/60; G06T 7/80; G06T 2207/10024; G06T 2207/20021; G06T 2207/20132; G06T 2207/20221; G06T 5/80; G06T 3/4038; G06T 3/608
See application file for complete search history.

(56) References Cited

U.S. PATENT DOCUMENTS

2013/0070125 A1* 3/2013 Albu .................... G06T 7/30
                                              348/241
2015/0256775 A1* 9/2015 Li ........................ G06T 3/047
                                              348/241

FOREIGN PATENT DOCUMENTS

| CN | 102845053 A | * | 12/2012 | ........... H04N 25/702 |
| CN | 103325110 B | * | 6/2016 | |
| JP | 2004032368 A | * | 1/2004 | ............. H04N 23/81 |
| JP | 4827213 B2 | * | 11/2011 | |

* cited by examiner

*Primary Examiner* — Michael Lee
(74) *Attorney, Agent, or Firm* — IPRTOP LLC

(57) ABSTRACT

An image processing method, an image processing device, and an electronic device are provided. The image processing method includes: acquiring images to be processed based on captured images; correcting the images to be processed in a horizontal direction to obtain first corrected images; rotating the first corrected images by 90 degrees along a first direction to obtain second corrected images; and correcting the second corrected images in the horizontal direction to obtain third corrected images. In the present technical solution, the software algorithm is optimized for binocular image stitching while fully utilizing hardware resources, thereby effectively reducing hardware performance requirements.

21 Claims, 7 Drawing Sheets

IMAGE PROCESSING METHOD, IMAGE PROCESSING DEVICE, AND ELECTRONIC DEVICE

FIELD OF THE INVENTION

The present disclosure relates to the technical field of image processing, and in particular, to an image processing method, an image processing device, and an electronic device.

BACKGROUND OF THE INVENTION

Video image stitching refers to a method of combining multiple overlapping images of the same scene into a larger composite image. It plays a crucial role in various fields, including medical imaging, computer vision, satellite data processing, and automatic target recognition.

Binocular images are captured using left and right cameras, and there exists a certain disparity between them. To obtain a broader field of view and more comprehensive image information, it is often necessary to stitch binocular images together.

SUMMARY OF THE INVENTION

The present disclosure provides an image processing method, an image processing device, and an electronic device, which optimize the software algorithm for binocular image stitching while fully utilizing hardware resources, effectively reducing hardware performance requirements.

A first aspect of the present disclosure provides an image processing method. The image processing method includes: acquiring images to be processed based on captured images; correcting the images to be processed in a horizontal direction to obtain first corrected images; rotating the first corrected images by 90 degrees along a first direction to obtain second corrected images; and correcting the second corrected images in the horizontal direction to obtain third corrected images.

In one embodiment of the first aspect, the image processing method further includes: performing an image fusion on the third corrected images to obtain a fused image; and rotating the fused image by 90 degrees along a second direction opposite to the first direction to obtain a stitched image.

In one embodiment of the first aspect, the acquiring of the images to be processed based on the captured images includes: receiving a left-view image and a right-view image provided from a binocular camera and adjusting the left-view image and the right-view image by an image signal processor, to obtain the images to be processed including an adjusted left-view image and an adjusted right-view image; the correcting of the images to be processed in the horizontal direction to obtain the first corrected images includes: horizontally correcting the adjusted left-view image and the adjusted right-view image by a horizontal distortion correction module to obtain a first corrected left-view image and a first corrected right-view image; the rotating of the first corrected images by 90 degrees along the first direction to obtain the second corrected images includes: performing, by a first rotation module, a positive rotation of 90 degrees on the first corrected left-view image and the first corrected right-view image to obtain a second corrected left-view image and a second corrected right-view image; the correcting of the second corrected images in the horizontal direction to obtain the third corrected images includes: horizontally correcting, by a central processing unit, the second corrected left-view image and the second corrected right-view image to obtain a third corrected left-view image and a third corrected right-view image; the image fusion of the third corrected images to obtain the fused image includes: fusing, by the central processing unit, the third corrected left-view image and the third corrected right-view image to obtain the fused image; and the rotating of the fused image by 90 degrees along the second direction to obtain the stitched image includes: performing an inverse rotation of 90 degrees on the fused image, and then scaling and cropping the fused image by a second rotation module, to obtain the stitched image.

In one embodiment of the first aspect, the receiving and adjusting of the left-view image and right-view image by the image signal processor includes: receiving, by the image signal processor, the left-view image and the right-view image from the binocular camera; and adjusting, by the image signal processor, brightnesses, the colors, and the exposures of the left-view image and the right-view image, respectively, so that the brightnesses, colors, and exposures of the left-view image and the right-view image are close to each other.

In one embodiment of the first aspect, the horizontal correcting of the adjusted left-view image and the adjusted right-view image by the horizontal distortion correction module includes: sequentially fetching and correcting, along a row direction, the adjusted left-view image by the horizontal distortion correction module to obtain the first corrected left-view image; and sequentially fetching and correcting, along the row direction, the adjusted right-view image by the horizontal distortion correction module to obtain the first corrected right-view image.

In one embodiment of the first aspect, the image processing method further includes: calibrating the binocular camera to obtain calibration parameters, and generating a first left-view horizontal correction lookup table and a first right-view horizontal correction lookup table based on the calibration parameters, wherein the horizontal correcting of the adjusted left-view image and the adjusted right-view image by the horizontal distortion correction module includes: horizontally correcting, based on the first left-view horizontal correction lookup table, the adjusted left-view image by the horizontal distortion correction module; and horizontally correcting, based on the first right-view horizontal correction lookup table, the adjusted right-view image by the horizontal distortion correction module.

In one embodiment of the first aspect, the horizontal correcting of the second corrected left-view image and the second corrected right-view image by the central processing unit to obtain the third corrected left-view image and the third corrected right-view image includes: sequentially fetching and correcting, along a row direction, the second corrected left-view image to obtain the third corrected left-view image; and sequentially fetching and correcting, along the row direction, the second corrected right-view image to obtain the third corrected right-view image; wherein the image fusion of the third corrected left-view image and the third corrected right-view image by the central processing unit to obtain the fused image includes: dividing the third corrected left-view image into a left-view overlapping region and a left-view non-overlapping region; dividing the third corrected right-view image into a right-view overlapping region and a right-view non-overlapping region; fusing the left-view overlapping region and the right-view overlapping region to obtain an overlapping fused image; and combining the left-view non-overlapping region, the overlapping fused image and the right-view non-overlapping region to obtain the fused image.

In one embodiment of the first aspect, the image processing method further includes: calibrating the binocular camera to obtain calibration parameters, and generating a second left-view horizontal correction lookup table, a second right-view horizontal correction lookup table, an image fusion lookup table, and an overlapping region lookup table based on the calibration parameters; the horizontal correcting of the second corrected left-view image and the second corrected right-view image by the central processing unit to obtain the third corrected left-view image and the third corrected right-view image includes: horizontally correcting, based on the second left-view horizontal correction lookup table, the second corrected left-view image to obtain the third corrected left-view image; and horizontally correcting, based on the second right-view horizontal correction lookup table, the second corrected right-view image to obtain the third corrected right-view image; wherein the image fusion of the third corrected left-view image and the third corrected right-view image by the central processing unit to obtain the fused image includes: dividing, based on the overlapping region lookup table, the third corrected left-view image into the left-view overlapping region and the left-view non-overlapping region; dividing, based on the overlapping region lookup table, the third corrected right-view image into the right-view overlapping region and the right-view non-overlapping region; and fusing, based on the image fusion lookup table, the left-view overlapping region and the right-view overlapping region to obtain the over-lapping fused image.

In one embodiment of the first aspect, the horizontal correcting of the second corrected left-view image and the second corrected right-view image by the central processing unit to obtain the third corrected left-view image and the third corrected right-view image includes: dividing the second corrected left-view image into a left-view overlapping region and a left-view non-overlapping region; dividing the second corrected right-view image into a right-view overlapping region and a right-view non-overlapping region; sequentially fetch and correct, along a row direction, the left-view overlapping region to obtain a left-view overlapping corrected image; sequentially fetching and correcting, along the row direction, the right-view overlapping region to obtain a right-view overlapping corrected image; wherein the image fusion of the third corrected left-view image and the third corrected right-view image by the central processing unit to obtain the fused image includes: fusing the left-view overlapping corrected image and the right-view overlapping corrected image to obtain an overlapping fused image; and combining the left-view non-overlapping region, the overlapping fused image and the right-view non-overlapping region to obtain the fused image.

In one embodiment of the first aspect, the image processing method further includes: calibrating the binocular camera to obtain calibration parameters, and generating a second left-view horizontal correction lookup table, a second right-view horizontal correction lookup table, an image fusion lookup table, and an overlapping region lookup table based on the calibration parameters; the horizontal correcting of the second corrected left-view image and the second corrected right-view image by the central processing unit to obtain the third corrected left-view image and the third corrected right-view image includes: dividing, based on the overlapping region lookup table, the second corrected left-view image into the left-view overlapping region and the left-view non-overlapping region; dividing, based on the overlapping region lookup table, the second corrected right-view image into the right-view overlapping region and the right-view non-overlapping region; horizontally correct, based on the second left-view horizontal correction lookup table, the left-view overlapping region to obtain the left-view overlapping corrected image; and horizontally correcting, based on the second right-view horizontal correction lookup table, the right-view overlapping region to obtain the right-view overlapping corrected image; wherein the fusing of the left-view overlapping corrected image and the right-view overlapping corrected image to obtain the overlapping fused image includes: fusing, based on the image fusion lookup table, the left-view overlapping corrected image and the right-view overlapping corrected image to obtain the overlapping fused image.

In one embodiment of the first aspect, the image processing method further includes: encoding the stitched image to obtain an encoded stitched image, and transmitting the encoded stitched image based on RTSP protocols.

A second aspect of the present disclosure provides an image processing device. The image processing device includes: an image signal processor, configured to acquire images to be processed based on captured images; a horizontal distortion correction module, configured to correct the images to be processed in a horizontal direction to obtain first corrected images; a first rotation module, configured to rotate the first corrected images by 90 degrees along a first direction to obtain second corrected images; and a central processing unit, configured to correct the second corrected images in the horizontal direction to obtain third corrected images.

In one embodiment of the second aspect, the central processing unit is further configured to perform an image fusion on the third corrected images to obtain a fused image, and the image processing device further includes: a second rotation module, configured to rotate the fused image by 90 degrees along a second direction opposite to the first direction to obtain a stitched image.

In one embodiment of the second aspect, the image signal processor is configured to receive a left-view image and a right-view image provided from a binocular camera, and adjust the left-view image and the right-view image to obtain the images to be processed including an adjusted left-view image and an adjusted right-view image; the horizontal distortion correction module is configured to horizontally correct the adjusted left-view image and the adjusted right-view image to obtain a first corrected left-view image and a first corrected right-view image; the first rotation module is configured to perform a positive rotation of 90 degrees on the first corrected left-view image and the first corrected right-view image to obtain a second corrected left-view image and a second corrected right-view image; the central processing unit is configured to horizontally correct the second corrected left-view image and the second corrected right-view image to obtain a third corrected left-view image and a third corrected right-view image, and fuse the third corrected left-view image and the third corrected right-view image to obtain the fused image; and the second rotation module is configured to perform an inverse rotation of 90 degrees on the fused image, and then scale and crop the fused image to obtain the stitched image.

In one embodiment of the second aspect, the image signal processor is configured to: receive the left-view image and the right-view image from the binocular camera; and adjust brightnesses, the colors, and the exposures of the left-view image and the right-view image, respectively, so that the brightnesses, colors, and exposures of the left-view image and the right-view image are close to each other.

In one embodiment of the second aspect, the horizontal distortion correction module is configured to: sequentially fetch and correct, along a row direction, the adjusted left-view image to obtain the first corrected left-view image; and sequentially fetch and correct, along the row direction, the adjusted right-view image to obtain the first corrected right-view image.

In one embodiment of the second aspect, the image processing device further includes: a calibration module, configured to calibrate the binocular camera to obtain calibration parameters, and generate a first left-view horizontal correction lookup table and a first right-view horizontal correction lookup table based on the calibration parameters, wherein the horizontal distortion correction module is configured to: horizontally correct the adjusted left-view image based on the first left-view horizontal correction lookup table; and horizontally correct the adjusted right-view image based on the first right-view horizontal correction lookup table.

In one embodiment of the second aspect, the central processing unit is configured to: sequentially fetch and correcting, along a row direction, the second corrected left-view image to obtain the third corrected left-view image; sequentially fetch and correct, along the row direction, the second corrected right-view image to obtain the third corrected right-view image; divide the third corrected left-view image into a left-view overlapping region and a left-view non-overlapping region; divide the third corrected right-view image into a right-view overlapping region and a right-view non-overlapping region; fuse the left-view overlapping region and the right-view overlapping region to obtain an overlapping fused image; and combine the left-view non-overlapping region, the overlapping fused image and the right-view non-overlapping region to obtain the fused image.

In one embodiment of the second aspect, the image processing device further includes: a calibration module, configured to calibrate the binocular camera to obtain calibration parameters, and generate a second left-view horizontal correction lookup table, a second right-view horizontal correction lookup table, an image fusion lookup table, and an overlapping region lookup table based on the calibration parameters; wherein the central processing unit is configured to: horizontally correct, based on the second left-view horizontal correction lookup table, the second corrected left-view image to obtain the third corrected left-view image; horizontally correct, based on the second right-view horizontal correction lookup table, the second corrected right-view image to obtain the third corrected right-view image; divide, based on the overlapping region lookup table, the third corrected left-view image into the left-view overlapping region and the left-view non-overlapping region; divide, based on the overlapping region lookup table, the third corrected right-view image into the right-view overlapping region and the right-view non-overlapping region; and fuse, based on the image fusion lookup table, the left-view overlapping region and the right-view overlapping region to obtain the overlapping fused image.

In one embodiment of the second aspect, the central processing unit is configured to: divide the second corrected left-view image into a left-view overlapping region and a left-view non-overlapping region; divide the second corrected right-view image into a right-view overlapping region and a right-view non-overlapping region; sequentially fetch and correct, along a row direction, the left-view overlapping region to obtain a left-view overlapping corrected image; sequentially fetch and correct, along the row direction, the right-view overlapping region to obtain a right-view overlapping corrected image; fuse the left-view overlapping corrected image and the right-view overlapping corrected image to obtain an overlapping fused image; and combine the left-view non-overlapping region, the overlapping fused image and the right-view non-overlapping region to obtain the fused image.

In one embodiment of the second aspect, the image processing device further includes: a calibration module, configured to calibrate the binocular camera to obtain calibration parameters, and generate a second left-view horizontal correction lookup table, a second right-view horizontal correction lookup table, an image fusion lookup table, and an overlapping region lookup table based on the calibration parameters; wherein the central processing unit is configured to: divide, based on the overlapping region lookup table, the second corrected left-view image into the left-view overlapping region and the left-view non-overlapping region; divide, based on the overlapping region lookup table, the second corrected right-view image into the right-view overlapping region and the right-view non-overlapping region; horizontally correct, based on the second left-view horizontal correction lookup table, the left-view overlapping region to obtain the left-view overlapping corrected image; horizontally correct, based on the second right-view horizontal correction lookup table, the right-view overlapping region to obtain the right-view overlapping corrected image; and fuse, based on the image fusion lookup table, the left-view overlapping corrected image and the right-view overlapping corrected image to obtain the overlapping fused image.

In one embodiment of the second aspect, the image processing device further includes: an encoding module, configured to encode the stitched image to obtain an encoded stitched image, and transmit the encoded stitched image based on RTSP protocols.

A third aspect of the present disclosure provides an electronic device. The electronic device includes: a memory, configured to store a processor-executable program; and a processor, configured to execute the program to cause the electronic device to: acquire images to be processed based on captured images; correct the images to be processed in a horizontal direction to obtain first corrected images; rotate the first corrected images by 90 degrees along a first direction to obtain second corrected images; and correct the second corrected images in the horizontal direction to obtain third corrected images.

The image processing method, image processing device, and electronic device of the present disclosure optimize the software algorithm for binocular image stitching while fully utilizing hardware resources. Remarkably, this stitching process doesn't rely on graphics processing units (GPUs), effectively reducing hardware performance requirements. Moreover, the image correction is split into two separate corrections, transforming from one two-dimensional fetch to two one-dimensional fetches. This significant improvement enhances operational efficiency, thereby fully utilizing both hardware and software resources. Furthermore, the image to be stitched is divided into overlapping and non-overlapping regions, and only the non-overlapping or overlapping regions are fused, reducing the data volume for pyramid fusion and enhancing computational efficiency. As a result, processor footprint and bandwidth are decreased, and ghosting and dislocation phenomena caused by parallaxes at the seams are minimized through pyramid fusion.

DETAILED DESCRIPTION OF THE INVENTION

The embodiments of the present disclosure will be described below. Those skilled can easily understand disclosure advantages and effects of the present disclosure according to contents disclosed by the specification. The present disclosure can also be implemented or applied through other different specific embodiments. Various details in this specification can also be modified or changed based on different viewpoints and applications without departing from the spirit of the present disclosure.

It should be noted that the drawings provided in this disclosure only illustrate the basic concept of the present disclosure in a schematic way, so the drawings only show the components closely related to the present disclosure. The drawings are not necessarily drawn according to the number, shape and size of the components in actual implementation; during the actual implementation, the type, quantity and proportion of each component can be changed as needed, and the components' layout may also be more complicated.

In existing technologies, a depth camera is used to stitch together two visible light images using depth information. However, this method tends to be costlier due to the additional hardware requirements. Another existing approach performs the stitching process in the cloud, where customers upload the videos to be stitched, and the results are then sent back to the client. Unfortunately, this approach suffers from poor real-time performance and high network demands, making it unsuitable for scenarios with strict real-time requirements or unreliable network conditions. Yet another approach relies on feature point matching for stitching, but it involves significant computational overhead and places higher demands on hardware performance.

To address the challenges posed by existing techniques, the present disclosure provides a binocular image stitching method. In this approach, the binocular images first undergo horizontal correction through an image signal processor (ISP). After a 90-degree rotation, another horizontal correction is performed through a processor, such as central processing units (CPUs). Subsequently, the horizontally corrected binocular images are fused, and the resulting fused image undergoes rotation, scaling, cropping, and other necessary adjustments to achieve the desired stitching effect. Finally, the encoded output can be displayed. By splitting the image correction into two separate corrections, both hardware and software resources can be fully utilized, leading to improved efficiency.

In the following, embodiments of the present disclosure are described by way of specific implementations in conjunction with accompanying drawings.

Figure 1:
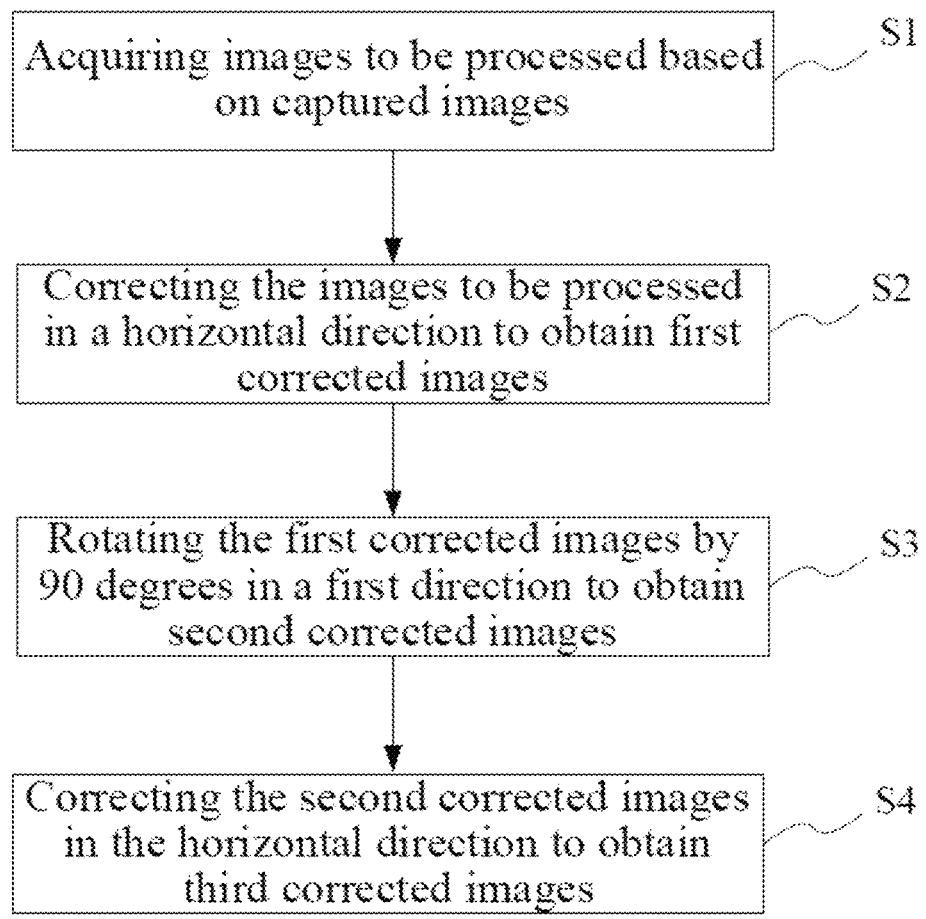
FIG. 1 shows a flowchart of an image processing method according to an embodiment of the present disclosure.
Figure 2:
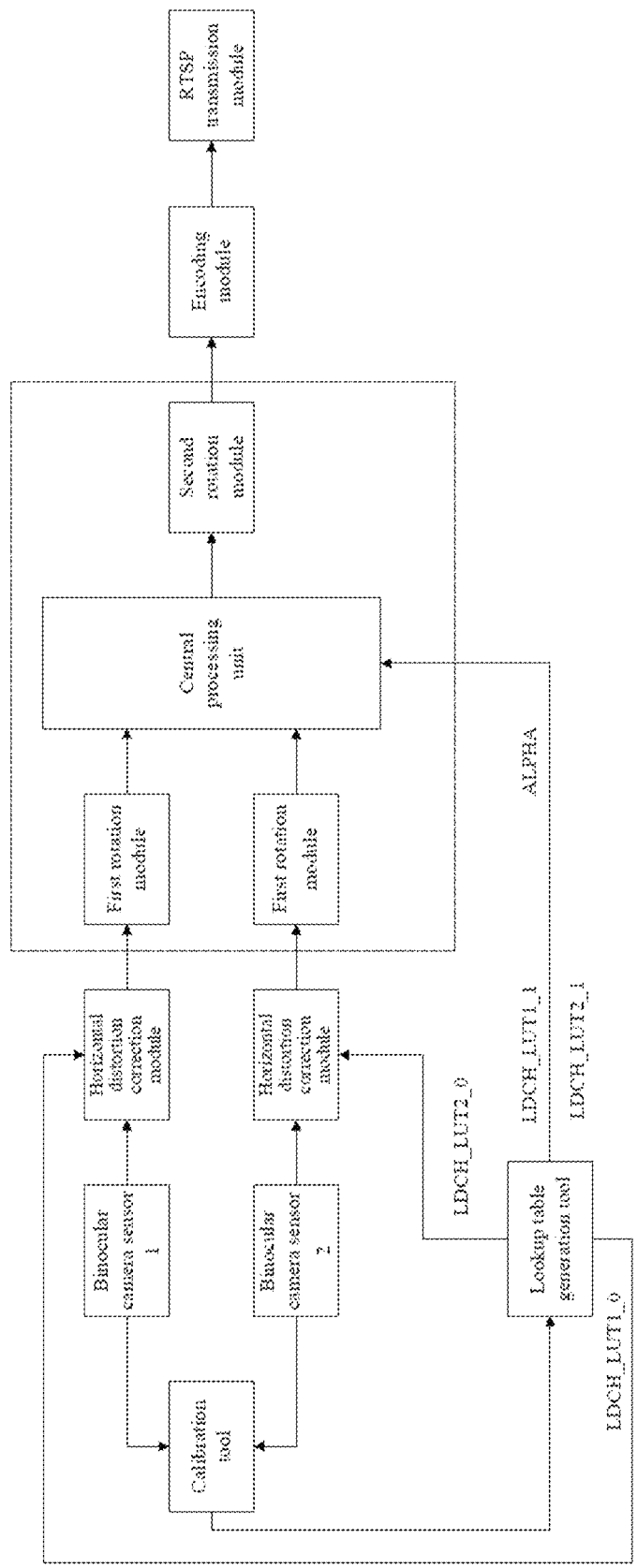
FIG. 2 shows a schematic frame diagram of an image processing method according to an embodiment of the present disclosure.

FIG. 1 shows a flowchart of an image processing method according to an embodiment of the present disclosure, and FIG. 2 shows a schematic frame diagram of the image processing method. As shown in FIG. 1, the image processing method of the present disclosure includes steps S1 through S4.

Step S1 includes acquiring images to be processed based on captured images.

In some embodiments, a sensor of a binocular camera is configured to generate a left-view image and a right-view image, and then provide the left-view image and the right-view image to an image signal processor. The image signal processor adjusts the left-view image and the right-view image to obtain the images to be processed including an adjusted left-view image and an adjusted right-view image. That is, the image signal processor adjusts brightnesses, colors, and exposures of the left-view image and the right-view image, respectively, so that the brightnesses, colors, and exposures of the left-view image and the right-view image are closer to each other.

Step S2 includes correcting the images to be processed in a horizontal direction to obtain first corrected images.

In some embodiments, the adjusted left-view image and adjusted right-view image are horizontally corrected by a lens-distortion-correction-only-in-the-horizontal-direction (LDCH) module on a system on chip (SOC), so as to obtain a first corrected left-view image and a first corrected right-view image.

In some embodiments, the correcting of the images to be processed in the horizontal direction to obtain the first corrected images includes horizontally correcting the adjusted left-view image and adjusted right-view image by a horizontal distortion correction module, and specifically includes step 21) to step 22).

Step 21) includes sequentially fetching and correcting, along a row direction, the adjusted left-view image by the horizontal distortion correction module to obtain the first corrected left-view image.

Step 22) includes sequentially fetching and correcting, along the row direction, the adjusted right-view image by the horizontal distortion correction module to obtain the first corrected right-view image.

In some embodiments, the horizontal correction is implemented by configuring a lookup table. First, the binocular camera is calibrated to obtain calibration parameters. Then, a first left-view horizontal correction lookup table LDCH_LUT1_0 and a first right-view horizontal correction lookup table LDCH_LUT2_0 are generated based on the calibration parameters. The horizontal distortion correction module horizontally corrects the adjusted left-view image based on the first left-view horizontal correction lookup table, and horizontally corrects the adjusted right-view image based on the first right-view horizontal correction lookup table. It should be noted that the calibration parameters are generated by a calibration tool at a personal computer (PC) terminal, and include respective internal and external parameters of two cameras of the binocular camera. The internal parameters may include an optical center, focal length, distortion coefficient, etc., and the external parameters may include a rotation matrix and translation vector between the two cameras. The first left-view horizontal correction lookup table LDCH_LUT1_0 and the first right-view horizontal correction lookup table LDCH_LUT2_0 are generated by a lookup table generation tool (such as Algo_Lut_Gen modules) of the PC terminal.

Step S3 includes rotating the first corrected images by 90 degrees in a first direction to obtain second corrected images.

In some embodiments, the rotating of the first corrected images by 90 degrees in the first direction to obtain the second corrected images includes: performing, by a first rotation module, a positive rotation of 90 degrees on the first corrected left-view image and the first corrected right-view image to obtain a second corrected left-view image and a second corrected right-view image. The first rotation module is installed on the SOC. The positive rotation may be a clockwise rotation or a counterclockwise rotation, depending on practical needs.

In some embodiments, the first rotation module includes raster graphic acceleration (RGA) modules. The RGA modules are hardware modules with image scaling and rotating functions, and can be used for accelerating point/line drawing, and performing common 2D graphics operations such as image scaling, rotation, bitBlt, alpha blending, and the like.

Step S4 includes correcting the second corrected images in the horizontal direction to obtain third corrected images.

In some embodiments, the correcting of the second corrected images in the horizontal direction to obtain the third corrected images includes: horizontally correcting, by a central processing unit (such as one LDCH module of a CPU terminal on the SOC), the second corrected left-view image and the second corrected right-view image to obtain a third corrected left-view image and a third corrected right-view image.

Figure 3:
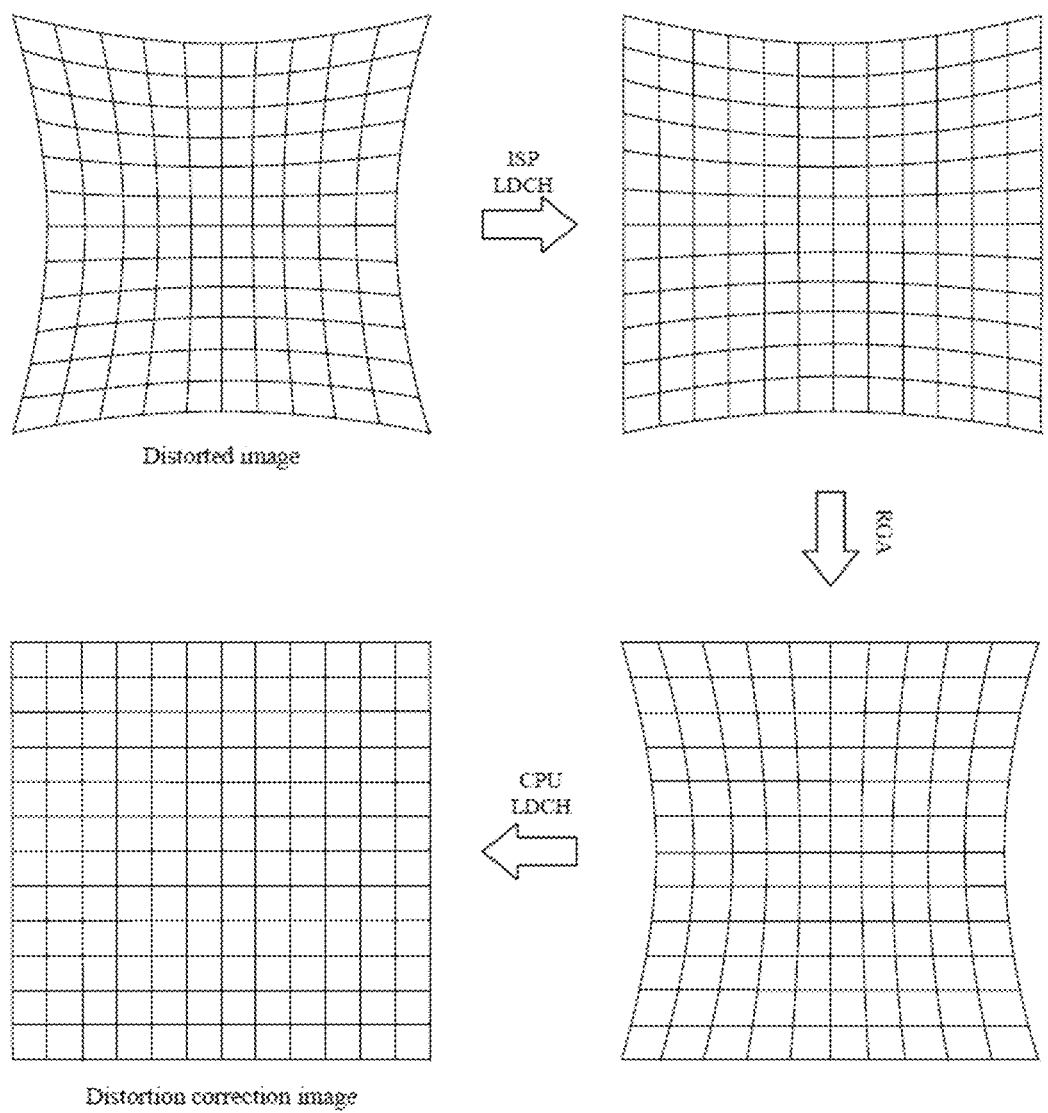
FIG. 3 shows a schematic diagram of two times of horizontal correction according to an embodiment of the present disclosure.

Distortion correction of a barrel-shaped distorted image is taken as an example. The left-view image and right-view image input by the binocular camera are set as images with barrel-shaped distortion. As shown in FIG. 3, after being horizontally corrected by the LDCH module located in the image signal processor, the images may be stretched in the horizontal direction to obtain horizontal correction images, reducing a vertical distortion of the images. Then the horizontal correction images perform a clockwise rotation of 90 degrees through the first rotation module (RGA module), so that a horizontal distortion of the images is converted to a vertical distortion. Finally, the LDCH module of the central processing unit horizontally corrects the rotated horizontal correction images to obtain de-distorted images. It should be noted that the de-distorted images at this time are obtained after rotating 90 degrees clockwise.

Figure 4:
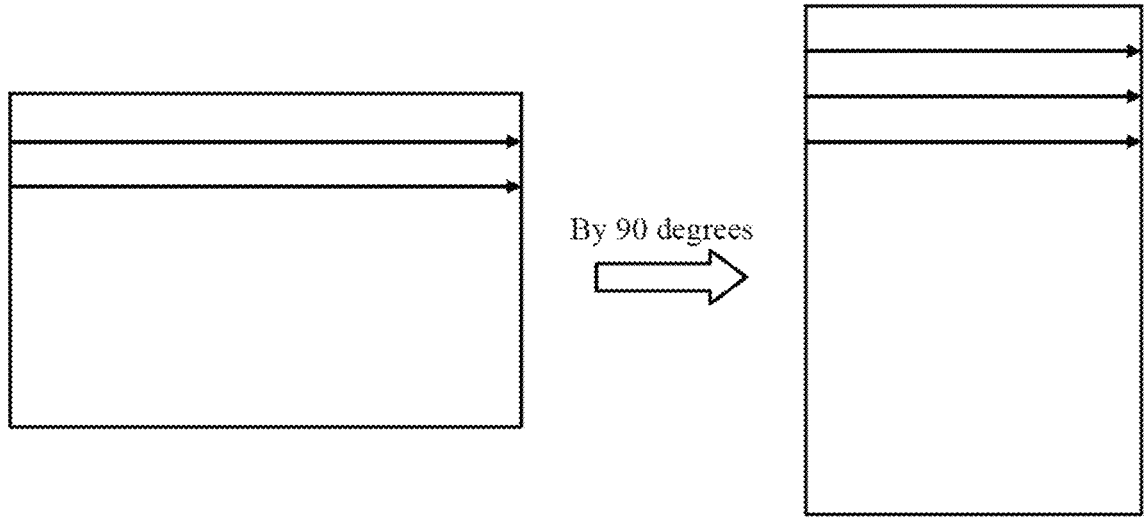
FIG. 4 shows a schematic diagram of image rotating in an embodiment of the present disclosure.
Figure 5:
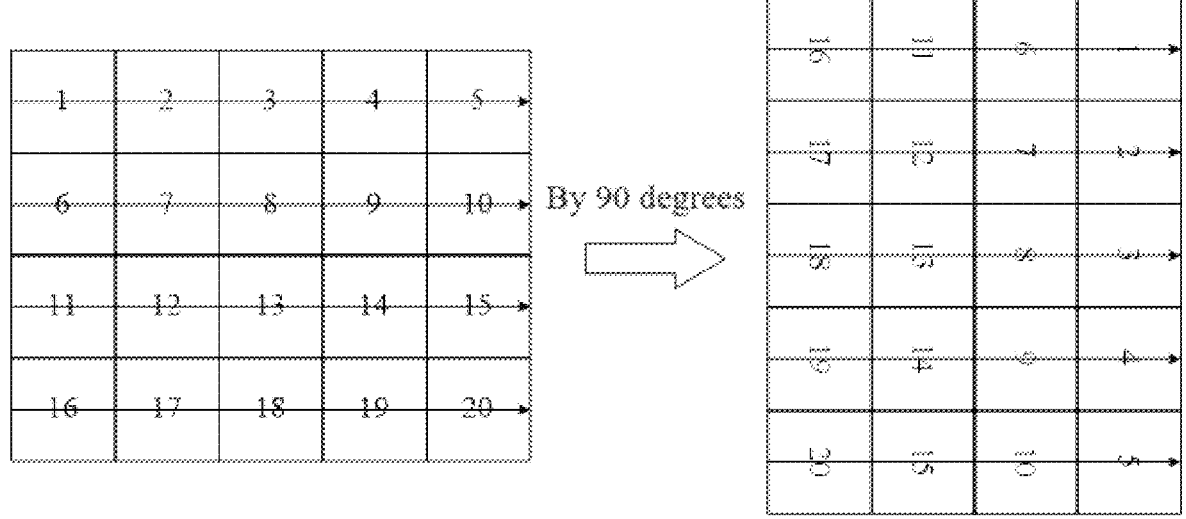
FIG. 5 shows a schematic diagram of image data storage in an embodiment of the present disclosure.

As shown in FIG. 4, when the LDCH module of the image signal processor performs horizontal correction, image data of each image are continuously fetched along the horizontal direction. Also, when the LDCH module of the central processing unit performs horizontal correction, image data of the rotated horizontal correction images are continuously fetched in the horizontal direction. As shown in FIG. 5, image data is stored in a compact manner, arranged row by row. If the column including 1, 6, 11 and 16 needs to be corrected, image data of the image needs to be fetched across rows for correction. However, after the image is rotated by 90 degrees through the first rotation module, the column including 1, 6, 11 and 16 becomes a row, and image data of the image can be sequentially fetched along a row direction to perform the horizontal correction, enhancing the computational efficiency and operation speed. Therefore, the image processing method of the present disclosure converts one two-dimensional image correction into two one-dimensional image corrections, and image data of the image is sequentially fetched along the row direction, which is beneficial to the implementation of hardware and software algorithms, and can improve the operation efficiency of the algorithm to the maximum extent.

In some embodiments, the image processing method further includes fusing the third corrected images to obtain a fused image, and rotating the fused image by 90 degrees in a second direction opposite to the first direction to obtain a stitched image.

In some embodiments, the third corrected left-view image and the third corrected right-view image are fused by the central processing unit to obtain the fused image. The fused image performs an inverse rotation of 90 degrees by a second rotation module, and then the fused image is scaled and cropped to obtain the stitched image. That is, the second rotation module (such as RGA modules) is used to perform a series of operations, such as inverse rotation of 90 degrees, scaling, and cropping, on the fused image to obtain the stitched image required by users. The inverse rotation of 90 degrees refers to a rotation that is in the direction opposite to the positive rotation of 90 degrees.

Figure 6:
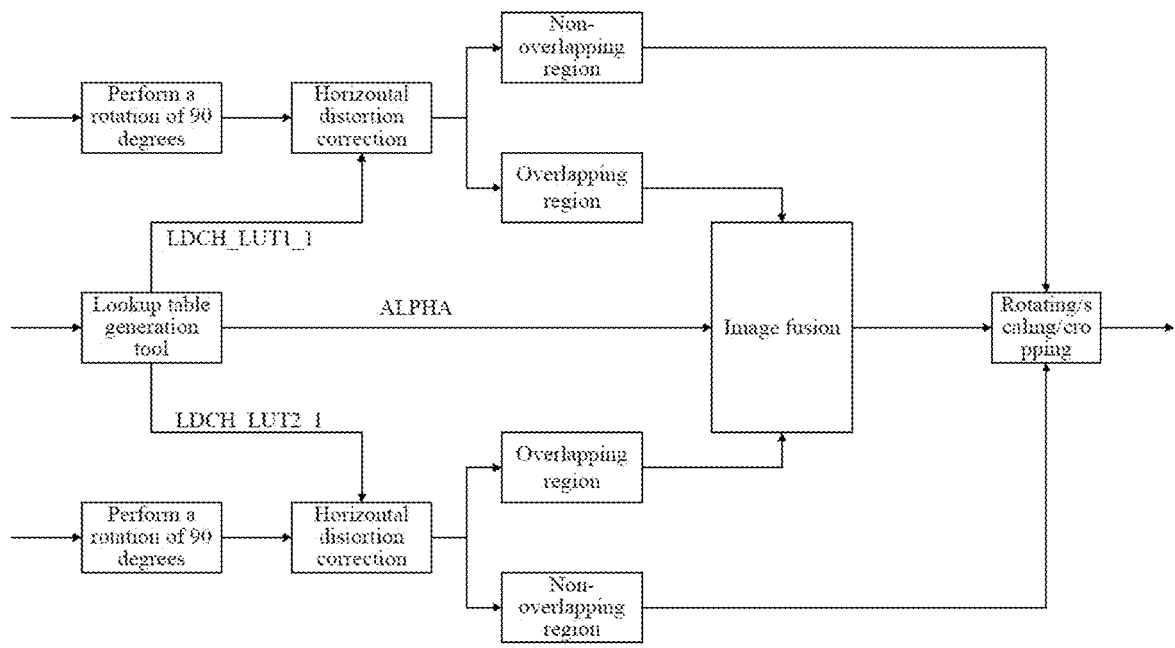
FIG. 6 shows a schematic diagram of image fusion according to an embodiment of the present disclosure.

In some embodiments, as shown in FIG. 6, the horizontal correcting of the second corrected left-view image and second corrected right-view image by the central processing unit to obtain the third corrected left-view image and the third corrected right-view image includes step 41) to step 42). The fusing of the third corrected left-view image and the third corrected right-view image by the central processing unit includes step 43) to step 46).

Step 41) includes sequentially fetching and correcting, along the row direction, the second corrected left-view image to obtain the third corrected left-view image.

Step 42) includes sequentially fetching and correcting, along the row direction, the second corrected right-view image to obtain the third corrected right-view image.

In some embodiments, the horizontal correction is implemented by configuring a lookup table. First, the binocular camera is calibrated to obtain calibration parameters. Then, a second left-view horizontal correction lookup table LDCH_LUT1_1 and a second right-view horizontal correction lookup table LDCH_LUT2_1 are generated based on the calibration parameters. The central processing unit horizontally corrects the second corrected left-view image, based on the second left-view horizontal correction lookup table, to obtain the third corrected left-view image. Similarly, the central processing unit horizontally corrects the second corrected right-view image, based on the second right-view horizontal correction lookup table, to obtain the third corrected right-view image.

In some embodiments, the second left-view horizontal correction lookup table LDCH_LUT1_1 and the second right-view horizontal correction lookup table LDCH_LUT2_1 are generated by a lookup table generation tool (such as Algo_Lut_Gen modules) of the PC terminal.

Step 43) includes dividing the third corrected left-view image into a left-view overlapping region and a left-view non-overlapping region.

Step 44) includes dividing the third corrected right-view image into a right-view overlapping region and a right-view non-overlapping region.

Figure 7:
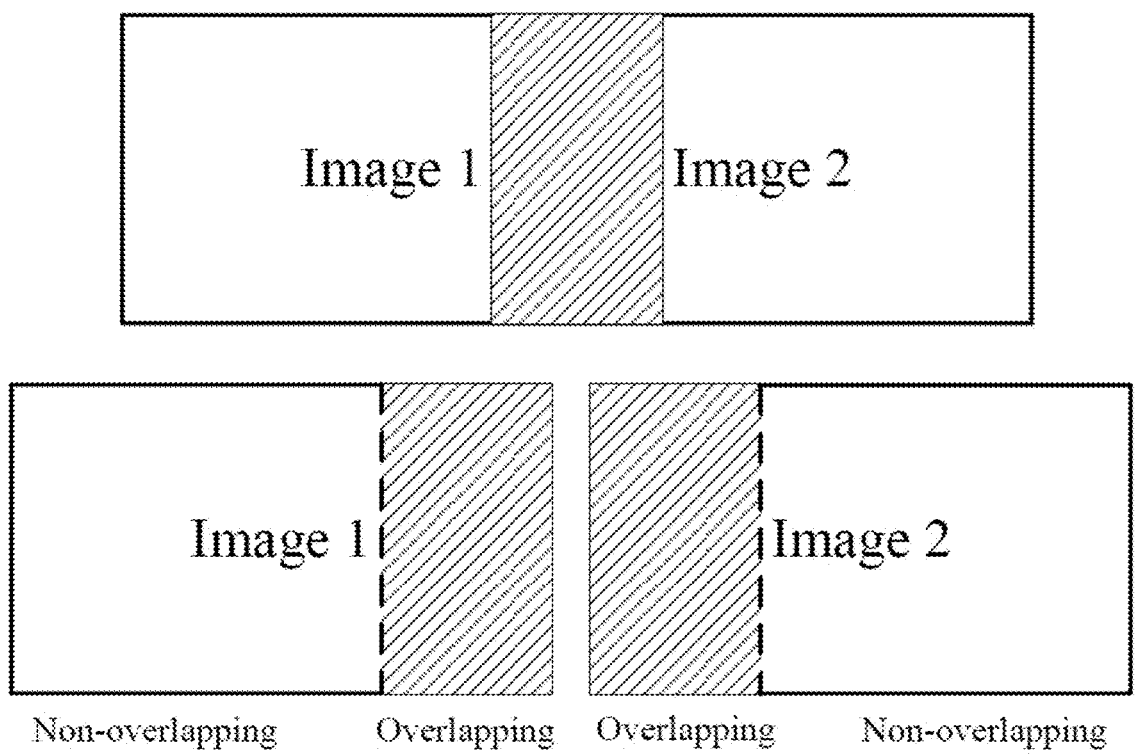
FIG. 7 shows a schematic diagram of overlapping and non-overlapping regions in an image according to an embodiment of the present disclosure.

In some embodiments, the overlapping region and the non-overlapping region are defined as shown in FIG. 7. Overlapping regions of two frames of images are shaded, and non-overlapping regions of two frames of images (their respective fields) are not shaded.

In some embodiments, the overlapping region and the non-overlapping region are divided based on lookup tables. First, the binocular camera is calibrated to obtain calibration parameters. Then, an overlapping region lookup table is generated based on the calibration parameters. The overlapping region lookup table is generated by a lookup table generation tool (such as Algo_Lut_Gen modules) of the PC terminal. Finally, the third corrected left-view image is divided into the left-view overlapping region and the left-view non-overlapping region based on the overlapping region lookup table. The third corrected right-view image is divided into the right-view overlapping region and the right-view non-overlapping region based on the overlapping region lookup table.

Step 45) includes fusing the left-view overlapping region and the right-view overlapping region to obtain an overlapping fused image.

In some embodiments, the fusion of the overlapping region and the non-overlapping region is implemented by a pyramid fusion algorithm. Only pyramid fusion is performed on the overlapping region, and no pyramid fusion needs to be performed on the non-overlapping region, in which case, when the overlapping region of the image is small, the calculation of redundant data will be reduced, the calculation amount of image fusion will be greatly reduced, and meanwhile, the friendliness of the pyramid fusion to the seam can be reserved. It should be noted that, in order to ensure that the overlapping region that needs to be fused and the non-overlapping region that does not need to be fused are naturally connected, a transition adjustment needs to be performed when generating the overlapping region lookup table. The transition adjustment is a process of adjusting content of the overlapping region lookup table, so that the overlapping and non-overlapping regions have a more natural transition at the boundary.

In some embodiments, the left-view overlapping region and the right-view overlapping region are fused based on an image fusion lookup table, so as to obtain the overlapping fused image. First, the binocular camera is calibrated to obtain calibration parameters. Then, an image fusion lookup table (ALPHA table) is generated based on the calibration parameters. The image fusion lookup table is generated by a lookup table generation tool (such as Algo_Lut_Gen modules) of the PC terminal. The ALPHA table is configured to describe weights when the two frames of images are fused.

Step 46) includes combining the left-view non-overlapping region, the overlapping fused image and the right-view non-overlapping region to obtain the fused image.

It should be noted that horizontal correction lookup tables required for setting the traditional two-dimensional distortion are denoted as MeshX2 and MeshY2, respectively, and the horizontal correction lookup tables required for setting two one-dimensional distortions of the present disclosure are respectively MeshX1 (LDCH correction by ISP) and MeshY1 (LDCH correction by CPU). The relationships among them are as follows:

$$MeshX1=MeshX2+OffsetX,$$

$$MeshY1=(ImageHeight-1)-Rotate90(MeshY2),$$

where OffsetX represents an offset of the X-direction lookup table required for the two one-dimensional distortions compared with a single two-dimensional correction, ImageHeight represents an image height, and Rotate 90 represents a clockwise rotation by 90 degrees.

Figure 8:
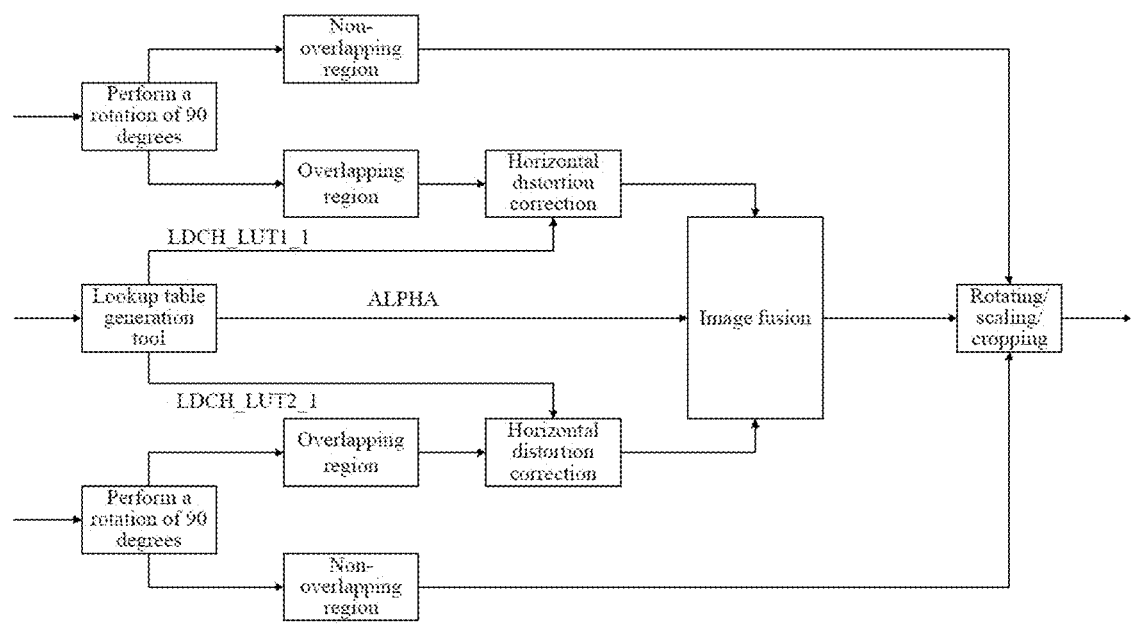
FIG. 8 shows a schematic diagram of image fusion according to another embodiment of the present disclosure.

In other embodiments, as shown in FIG. 8, the horizontal correcting of the second corrected left-view image and second corrected right-view image by the central processing unit to obtain the third corrected left-view image and the third corrected right-view image includes step 41') to step 44'). The fusing of the third corrected left-view image and the third corrected right-view image by the central processing unit includes step 45') to step 46').

Step 41') includes dividing the second corrected left-view image into a left-view overlapping region and a left-view non-overlapping region.

Step 42') includes dividing the second corrected right-view image into a right-view overlapping region and a right-view non-overlapping region.

Step 43') includes sequentially fetching and correcting, along the row direction, image data of the left-view overlapping region to obtain a left-view overlapping corrected image, and the left-view non-overlapping region and the left-view overlapping corrected image constitute the third corrected left-view image.

Step 44') includes sequentially fetching and correcting, along the row direction, image data of the right-view overlapping region to obtain a right-view overlapping corrected image, and the right-view non-overlapping region and the right-view overlapping corrected image constitute the third corrected right-view image.

Step 45') includes fusing the left-view overlapping corrected image and the right-view overlapping corrected image to obtain an overlapping fused image.

Step 46') includes combining the left-view non-overlapping region, the overlapping fused image and the right-view non-overlapping region to obtain the fused image.

In some embodiments, the binocular camera is calibrated to obtain calibration parameters, and the second left-view horizontal correction lookup table, second right-view horizontal correction lookup table, image fusion lookup table, and overlapping region lookup table are generated based on the calibration parameters. The second corrected left-view image is divided into the left-view overlapping region and the left-view non-overlapping region based on the overlapping region lookup table. The second corrected right-view image is divided into the right-view overlapping region and the right-view non-overlapping region based on the overlapping region lookup table. The processor horizontally corrects the left-view overlapping region based on the second left-view horizontal correction lookup table, so as to obtain the left-view overlapping corrected image. The processor horizontally corrects the right-view overlapping region based on the second right-view horizontal correction lookup table, so as to obtain the right-view overlapping corrected image. The left-view overlapping corrected image and the right-view overlapping corrected image are fused based on the image fusion lookup table, so as to obtain the overlapping fused image. In some embodiments, the image processing method of the present disclosure further includes encoding the stitched image to obtain an encoded stitched image, and transmitting the encoded stitched image based on RTSP protocols, so that the user obtains the stitched image in real time.

It should be noted that the image processing method of the present disclosure may support image stitching with two or more paths to meet requirements of different application scenarios.

It should be noted that the scope of the image processing method described in the embodiments of the present disclosure is not limited to the sequence of steps listed herein. Any scheme realized by adding or subtracting steps or replacing steps of the traditional techniques according to the principle of the present disclosure is included in the scope of the present disclosure.

Figure 9:
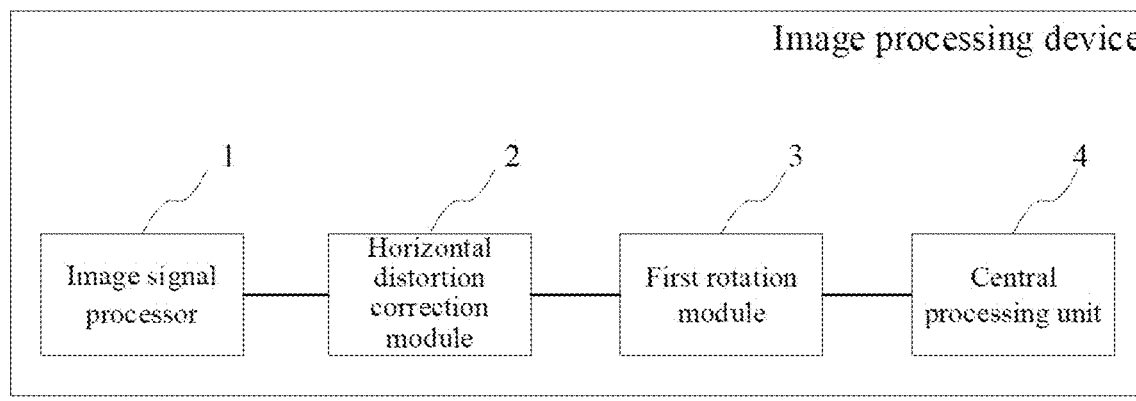
FIG. 9 shows a schematic structural diagram of an image processing device according to an embodiment of the present disclosure.

FIG. 9 shows a schematic structural diagram of an image processing device according to an embodiment of the present disclosure. As shown in FIG. 9, the image processing device of the present disclosure includes an image signal processor 1, a horizontal distortion correction module 2, a first rotation module 3, and a central processing unit 4.

The image signal processor 1 is configured to acquire images to be processed based on captured images.

In some embodiments, a sensor of a binocular camera is configured to generate a left-view image and a right-view image, and then provide the left-view image and the right-view image to the image signal processor. The image signal processor adjusts the left-view image and the right-view image to obtain the images to be processed including an adjusted left-view image and an adjusted right-view image. Specifically, the image signal processor adjusts brightnesses, colors, and exposures of the left-view image and the right-view image, respectively, so that the brightnesses, colors, and exposures of the left-view image and the right-view image are close to each other.

The horizontal distortion correction module 2 is connected to the image signal processor 1, and is configured to correct the images to be processed in a horizontal direction to obtain first corrected images.

In some embodiments, the adjusted left-view image and adjusted right-view image are horizontally corrected by a lens-distortion-correction-only-in-the-horizontal-direction (LDCH) module on a system on chip (SOC), so as to obtain a first corrected left-view image and a first corrected right-view image.

In some embodiments, the horizontal distortion correction module 2 is configured to sequentially fetch and correct the adjusted left-view image along a row direction, so as to obtain the first corrected left-view image. Similarly, the horizontal distortion correction module 2 is configured to sequentially fetch and correct the adjusted right-view image along the row direction, so as to obtain the first corrected right-view image.

In some embodiments, the horizontal correction is implemented by configuring a lookup table. First, the binocular camera is calibrated to obtain calibration parameters. Then, a first left-view horizontal correction lookup table LDCH_LUT1_0 and a first right-view horizontal correction lookup table LDCH_LUT2_0 are generated based on the calibration parameters. The horizontal distortion correction module horizontally corrects the adjusted left-view image based on the first left-view horizontal correction lookup table, and horizontally corrects the adjusted right-view image based on the first right-view horizontal correction lookup table. It should be noted that the calibration parameters are generated by a calibration tool at a personal computer (PC) terminal, and include respective internal and external parameters of two cameras of the binocular camera. The internal parameters may include an optical center, focal length, distortion coefficient, etc., and the external parameters may include a rotation matrix and translation vector between the two cameras. The first left-view horizontal correction lookup table LDCH_LUT1_0 and the first right-view horizontal correction lookup table LDCH_LUT2_0 are generated by a lookup table generation tool (such as Algo_Lut_Gen modules) of the PC terminal.

The first rotation module 3 is configured to be connected with the horizontal distortion correction module 2, so as to rotate the first corrected images by 90 degrees in a first direction to obtain second corrected images.

In some embodiments, the first rotation module is configured to perform a positive rotation of 90 degrees on the first corrected left-view image and the first corrected right-view image to obtain a second corrected left-view image and a second corrected right-view image. The first rotation module is installed on the SOC. The positive rotation may be a clockwise rotation or a counterclockwise rotation, and may be selected as needed.

In some embodiments, the first rotation module adopts raster graphic acceleration (RGA) modules. The RGA modules are hardware module with image scaling and rotating functions, and can be used for accelerating point/line drawing, and performing common 2D graphics operations such as image scaling, rotation, bitBlt, alpha blending, and the like.

The central processing unit 4 is connected to the first rotation module 3, and is configured to correct the second corrected images in the horizontal direction to obtain third corrected images.

In some embodiments, the central processing unit (such as one LDCH module of a CPU terminal on the SOC) is configured to horizontally correct the second corrected left-view image and the second corrected right-view image, so as to obtain a third corrected left-view image and a third corrected right-view image.

Distortion correction of a barrel-shaped distorted image is taken as an example. The left-view image and right-view image input by the binocular camera are set as images with barrel-shaped distortion. As shown in FIG. 3, after being horizontally corrected by the LDCH module located in the image signal processor, the images may be stretched in the horizontal direction to obtain horizontal correction images, reducing a vertical distortion of the images. Then the horizontal correction images perform a clockwise rotation of 90 degrees through the first rotation module (RGA module), so that a horizontal distortion of the images is converted to the vertical distortion. Finally, the LDCH module of the central processing unit horizontally corrects the rotated horizontal correction images to obtain de-distorted images. It should be noted that the de-distorted images at this time are obtained after rotating 90 degrees clockwise.

As shown in FIG. 4, when the LDCH module of the image signal processor performs horizontal correction, image data of each image are continuously fetched along the horizontal direction. Also, when the LDCH module of the central processing unit performs horizontal correction, image data of the rotated horizontal correction images are continuously fetched in the horizontal direction. As shown in FIG. 5, image data is stored in a compact manner, arranged row by row. If the column including 1, 6, 11 and 16 needs to be corrected, image data of the image needs to be fetched across rows for correction. However, after the image is rotated by 90 degrees through the first rotation module, the column including 1, 6, 11 and 16 becomes a row, and image data of the image can be sequentially fetched along a row direction to perform the horizontal correction, enhancing the computational efficiency and operation speed. Therefore, the image processing method of the present disclosure converts one two-dimensional image correction into two one-dimensional image corrections, and image data of the image is sequentially fetched along the row direction, which is beneficial to the implementation of hardware and software algorithms, and can improve the operation efficiency of the algorithm to the maximum extent.

In some embodiments, the central processing unit is further configured to fuse the third corrected images to obtain a fused image. The image processing device further includes a second rotation module. The second rotation module is configured to rotate the fused image by 90 degrees in a second direction opposite to the first direction to obtain a stitched image.

In some embodiments, the third corrected left-view image and the third corrected right-view image are fused by the central processing unit to obtain the fused image. The fused image performs an inverse rotation of 90 degrees by a second rotation module, and then the fused image is scaled and cropped to obtain the stitched image. That is, the second rotation module (such as RGA modules) is used to perform a series of operations such as inverse rotation of 90 degrees, scaling, and cropping on the fused image to obtain the stitched image required by users. The inverse rotation of 90 degrees refers to a rotation that is in the opposite direction to the positive rotation of 90 degrees.

In some embodiments, as shown in FIG. 6, the central processing unit horizontally corrects the second corrected left-view image and the second corrected right-view image to obtain a third corrected left-view image and a third corrected right-view image, and then fuses the third corrected left-view image and the third corrected right-view image.

The central processing unit is configured to sequentially fetch and correct the second left-view corrected image along the row direction, so as to obtain the third corrected left-view image. Similarly, the central processing unit is configured to sequentially fetch and correct the second corrected right-view image along the row direction, so as to obtain the third corrected right-view image.

In some embodiments, the horizontal correction is implemented by configuring a lookup table. First, the binocular camera is calibrated to obtain calibration parameters. Then, a second left-view horizontal correction lookup table LDCH_LUT1_1 and a second right-view horizontal correction lookup table LDCH_LUT2_1 are generated based on the calibration parameters. The central processing unit horizontally corrects the second corrected left-view image, based on the second left-view horizontal correction lookup table, to obtain the third corrected left-view image. Similarly, the central processing unit horizontally corrects the second corrected right-view image, based on the second right-view horizontal correction lookup table, to obtain the third corrected right-view image.

In some embodiments, the second left-view horizontal correction lookup table LDCH_LUT1_1 and the second right-view horizontal correction lookup table LDCH_LUT2_1 are generated by a lookup table generation tool (such as Algo_Lut_Gen modules) of the PC terminal.

The central processing unit is configured to divide the third corrected left-view image into a left-view overlapping region and a left-view non-overlapping region. And the central processing unit is configured to divide the third corrected right-view image into a right-view overlapping region and a right-view non-overlapping region.

In some embodiments, the overlapping region and the non-overlapping region are defined as shown in FIG. 7. Overlapping regions of two frames of images are shown as shadow regions, and non-overlapping regions of two frames of images (their respective fields) are shown as non-shadow regions.

In some embodiments, the overlapping region and the non-overlapping region are divided based on lookup tables. First, the binocular camera is calibrated to obtain calibration parameters. Then, an overlapping region lookup table is generated based on the calibration parameters. The overlapping region lookup table is generated by a lookup table generation tool (such as Algo_Lut_Gen modules) of the PC terminal. Finally, the third corrected left-view image is divided into the left-view overlapping region and the left-view non-overlapping region based on the overlapping region lookup table. The third corrected right-view image is divided into the right-view overlapping region and the right-view non-overlapping region based on the overlapping region lookup table.

In addition, the central processing unit is configured to fuse the left-view overlapping region and the right-view overlapping region to obtain an overlapping fused image.

In some embodiments, the fusion of the overlapping region and the non-overlapping region is implemented by a pyramid fusion algorithm. Only pyramid fusion is performed on the overlapping region, and no pyramid fusion needs to be performed on the non-overlapping region. When the overlapping region of the image is small, the calculation of redundant data is reduced, the calculation amount of image fusion is greatly reduced, and meanwhile, the friendliness of the pyramid fusion to the seam can be reserved. It should be noted that, in order to ensure that the overlapping region that needs to be fused and the non-overlapping region that does not need to be fused are excessively natural, a transition adjustment needs to be performed when generating the overlapping region lookup table. The transition adjustment is a process of adjusting content of the overlapping region lookup table, so that the overlapping and non-overlapping regions have a more natural transition at the boundary.

In some embodiments, the left-view overlapping region and the right-view overlapping region are fused based on an image fusion lookup table, so as to obtain the overlapping fused image. First, the binocular camera is calibrated to obtain calibration parameters. Then, an image fusion lookup table (ALPHA table) is generated based on the calibration parameters. The image fusion lookup table is generated by a lookup table generation tool (such as Algo_Lut_Gen modules) of the PC terminal. The ALPHA table is configured to describe a weight when the two frames of images are fused.

The central processing unit is configured to combine the left-view non-overlapping region, the overlapping fused image and the right-view non-overlapping region to obtain the fused image.

It should be noted that horizontal correction lookup tables required for setting the traditional two-dimensional distortion are denoted as MeshX2 and MeshY2, respectively, and the horizontal correction lookup tables required for setting two one-dimensional distortions of the present disclosure are respectively MeshX1 (LDCH correction by ISP) and MeshY1 (LDCH correction by CPU). The relationships among them are as follows:

$$MeshX1 = MeshX2 + OffsetX,$$

$$MeshY1 = (ImageHeight - 1) - Rotate90(MeshY2),$$

where OffsetX represents an offset of the X-direction lookup table required for the two one-dimensional distortions compared with a single two-dimensional correction, ImageHeight represents an image height, and Rotate 90 represents a clockwise rotation by 90 degrees.

In other embodiments, as shown in FIG. 8, the central processing unit horizontally corrects the second corrected left-view image and the second corrected right-view image to obtain a third corrected left-view image and a third corrected right-view image, and then fuses the third corrected left-view image and the third corrected right-view image.

The central processing unit is configured to divide the second corrected left-view image into a left-view overlapping region and a left-view non-overlapping region.

Similarly, the central processing unit is configured to divide the second corrected right-view image into a right-view overlapping region and a right-view non-overlapping region.

The central processing unit is configured to sequentially fetch and correct the left-view overlapping region along the row direction, so as to obtain a left-view overlapping corrected image, and the left-view non-overlapping region and the left-view overlapping corrected image constitute the third corrected left-view image.

Similarly, the central processing unit is configured to sequentially fetch and correct the right-view overlapping region along the row direction, so as to obtain a right-view overlapping corrected image, and the right-view non-overlapping region and the right-view overlapping corrected image constitute the third corrected right-view image. The central processing unit is configured to fuse the left-view overlapping corrected image and the right-view overlapping corrected image to obtain the overlapping fused image.

The central processing unit is further configured to combine the left-view non-overlapping region, the overlapping fused image and the right-view non-overlapping region to obtain the fused image.

In some embodiments, the binocular camera is calibrated to obtain calibration parameters, and the second left-view horizontal correction lookup table, second right-view horizontal correction lookup table, image fusion lookup table, and overlapping region lookup table are generated based on the calibration parameters.

The second corrected left-view image is divided into the left-view overlapping region and the left-view non-overlapping region based on the overlapping region lookup table. The second corrected right-view image is divided into the right-view overlapping region and the right-view non-overlapping region based on the overlapping region lookup table. The processor horizontally corrects the left-view overlapping region based on the second left-view horizontal correction lookup table, so as to obtain the left-view overlapping corrected image. The processor horizontally corrects the right-view overlapping region based on the second right-view horizontal correction lookup table, so as to obtain the right-view overlapping corrected image. The left-view overlapping corrected image and the right-view overlapping corrected image are fused based on the image fusion lookup table, so as to obtain the overlapping fused image.

In some embodiments, the image processing device of the present disclosure further includes an encoding module, and the encoding module is configured to encode the stitched image to obtain an encoded stitched image, and transmit the encoded stitched image based on RTSP protocols, so that the user obtains the stitched image in real time.

It should be noted that the image processing device of the present disclosure includes, but is not limited to, the structure of the image processing device listed in the present disclosure. Any structural adjustment or replacement of the prior art made according to the principles of the present disclosure is included in the scope of the present disclosure.

In the several embodiments proposed in the present disclosure, the disclosed systems, devices, or methods can be implemented in other ways. For example, the embodiments of devices described above are only illustrative, and the division of modules or units is only a logical functional division. In actual implementation, there may be other division methods, such as multiple modules or units can be combined or integrated into another system, or some features can be ignored or not executed. Here, the coupling or direct coupling or communication connection between each other can be indirect coupling or communication connection through some interfaces, devices, modules, or units, and can be electrical connection, mechanical connection, or other connections.

The modules or units shown as separate components can be physically separated or not. The components shown as modules or units can be physical modules or not. That is, they can be located in one place, or they can also be distributed to multiple network units. Some or all of the modules or units can be selected as needed to achieve the purpose of the embodiment. For example, in one embodiment of the present disclosure, each functional module or unit can be integrated into one processing module. Each functional module or unit can exist physically separately, or two or more modules or units can be integrated into one module or unit.

The ordinary technical personnel in this field should further realize that the units and algorithm steps of each example described in combination with the embodiments disclosed here can be implemented by electronic hardware, computer software, or a combination of both. In the above description, each example's composition and steps have been described generally based on functions, so as to clearly illustrate the interchangeability of hardware and software. Whether these functions are executed by hardware or software depends on the specific application and design constraints of the technical solution. Professional technicians can use different methods to implement the functions described for each specific situation, but such implementation should not be considered beyond the scope of the present disclosure.

Figure 10:
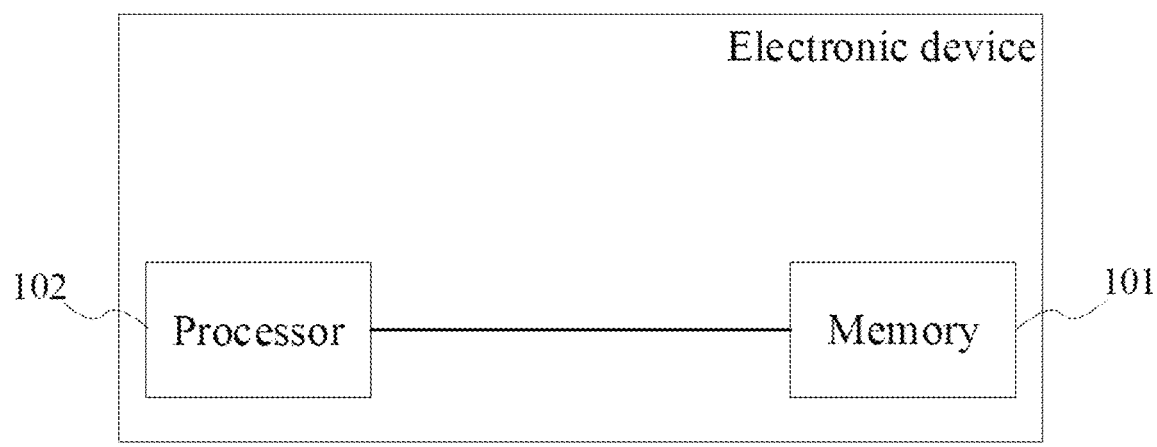
FIG. 10 shows a schematic diagram of an electronic device according to an embodiment of the present disclosure.

FIG. 10 shows a schematic diagram of an electronic device according to an embodiment of the present disclosure. As shown in FIG. 10, the electronic device of the present disclosure includes a memory 101 and a processor 102.

The memory 101 is configured to store a program to be executed by the processor 102. In some embodiments, the memory 101 includes one or more of a ROM, RAM, magnetic disk, U disk, memory card, optical disk, or other medium that can store program codes.

The processor 102 is configured to execute the program, so that the electronic device executes the above image processing method. The processor 102 can be a general processor, including a Central Processing Unit (CPU), a Network Processor (NP), etc. It can also be a Digital Signal Processor (DSP) or an Application Specific Integrated Circuit (ASIC), a Field Programmable Gate Array (FPGA) or other programmable logic devices, discrete gates or transistor logic devices, discrete hardware components.

The above-mentioned embodiments only exemplarily illustrate the principles and effects of the present disclosure, but are not used to limit the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

The invention claimed is:

1. An image processing method, comprising:
acquiring images to be processed based on captured images;
correcting the images to be processed in a horizontal direction to obtain first corrected images;
rotating the first corrected images by 90 degrees along a first direction to obtain second corrected images;
correcting the second corrected images in the horizontal direction to obtain third corrected images;
performing an image fusion on the third corrected images to obtain a fused image; and
rotating the fused image by 90 degrees along a second direction opposite to the first direction to obtain a stitched image.

2. The image processing method of claim 1, wherein
the acquiring of the images to be processed based on the captured images comprises: receiving a left-view image and a right-view image provided from a binocular camera and adjusting the left-view image and the right-view image by an image signal processor, to obtain the images to be processed comprising an adjusted left-view image and an adjusted right-view image;
the correcting of the images to be processed in the horizontal direction to obtain the first corrected images comprises: horizontally correcting the adjusted left-view image and the adjusted right-view image by a horizontal distortion correction module to obtain a first corrected left-view image and a first corrected right-view image;
the rotating of the first corrected images by 90 degrees along the first direction to obtain the second corrected images comprises: performing, by a first rotation module, a positive rotation of 90 degrees on the first corrected left-view image and the first corrected right-view image to obtain a second corrected left-view image and a second corrected right-view image;
the correcting of the second corrected images in the horizontal direction to obtain the third corrected images comprises: horizontally correcting, by a central processing unit, the second corrected left-view image and the second corrected right-view image to obtain a third corrected left-view image and a third corrected right-view image;
the image fusion of the third corrected images to obtain the fused image comprises: fusing, by the central processing unit, the third corrected left-view image and the third corrected right-view image to obtain the fused image; and
the rotating of the fused image by 90 degrees along the second direction to obtain the stitched image comprises: performing an inverse rotation of 90 degrees on the fused image, and then scaling and cropping the fused image by a second rotation module, to obtain the stitched image.

3. The image processing method of claim 2, wherein the receiving and adjusting of the left-view image and right-view image by the image signal processor comprises:
receiving, by the image signal processor, the left-view image and the right-view image from the binocular camera; and
adjusting, by the image signal processor, brightnesses, colors, and exposures of the left-view image and the right-view image, respectively, so that the brightnesses, the colors, and the exposures of the left-view image and the right-view image are close to each other.

4. The image processing method of claim 2, wherein the horizontal correcting of the adjusted left-view image and the adjusted right-view image by the horizontal distortion correction module comprises:
sequentially fetching and correcting, along a row direction, the adjusted left-view image by the horizontal distortion correction module to obtain the first corrected left-view image; and
sequentially fetching and correcting, along the row direction, the adjusted right-view image by the horizontal distortion correction module to obtain the first corrected right-view image.

5. The image processing method of claim 2, further comprising:
calibrating the binocular camera to obtain calibration parameters, and generating a first left-view horizontal correction lookup table and a first right-view horizontal correction lookup table based on the calibration parameters, wherein
the horizontal correcting of the adjusted left-view image and the adjusted right-view image by the horizontal distortion correction module comprises: horizontally correcting, based on the first left-view horizontal correction lookup table, the adjusted left-view image by the horizontal distortion correction module; and horizontally correcting, based on the first right-view horizontal correction lookup table, the adjusted right-view image by the horizontal distortion correction module.

6. The image processing method of claim 2, wherein the horizontal correcting of the second corrected left-view image and the second corrected right-view image by the central processing unit to obtain the third corrected left-view image and the third corrected right-view image comprises:
sequentially fetching and correcting, along a row direction, the second corrected left-view image to obtain the third corrected left-view image; and sequentially fetching and correcting, along the row direction, the second corrected right-view image to obtain the third corrected right-view image;
wherein the image fusion of the third corrected left-view image and the third corrected right-view image by the central processing unit to obtain the fused image comprises: dividing the third corrected left-view image into a left-view overlapping region and a left-view non-overlapping region; dividing the third corrected right-view image into a right-view overlapping region and a right-view non-overlapping region; fusing the left-view overlapping region and the right-view overlapping region to obtain an overlapping fused image; and combining the left-view non-overlapping region, the overlapping fused image and the right-view non-overlapping region to obtain the fused image.

7. The image processing method of claim 6, further comprising:
calibrating the binocular camera to obtain calibration parameters, and generating a second left-view horizontal correction lookup table, a second right-view horizontal correction lookup table, an image fusion lookup table, and an overlapping region lookup table based on the calibration parameters;

the horizontal correcting of the second corrected left-view image and the second corrected right-view image by the central processing unit to obtain the third corrected left-view image and the third corrected right-view image comprises: horizontally correcting, based on the second left-view horizontal correction lookup table, the second corrected left-view image to obtain the third corrected left-view image; and horizontally correcting, based on the second right-view horizontal correction lookup table, the second corrected right-view image to obtain the third corrected right-view image;

wherein the image fusion of the third corrected left-view image and the third corrected right-view image by the central processing unit to obtain the fused image comprises: dividing, based on the overlapping region lookup table, the third corrected left-view image into the left-view overlapping region and the left-view non-overlapping region; dividing, based on the overlapping region lookup table, the third corrected right-view image into the right-view overlapping region and the right-view non-overlapping region; and fusing, based on the image fusion lookup table, the left-view overlapping region and the right-view overlapping region to obtain the overlapping fused image.

8. The image processing method of claim 2, wherein the horizontal correcting of the second corrected left-view image and the second corrected right-view image by the central processing unit to obtain the third corrected left-view image and the third corrected right-view image comprises:

dividing the second corrected left-view image into a left-view overlapping region and a left-view non-overlapping region;

dividing the second corrected right-view image into a right-view overlapping region and a right-view non-overlapping region;

sequentially fetching and correcting, along a row direction, the left-view overlapping region to obtain a left-view overlapping corrected image;

sequentially fetching and correcting, along the row direction, the right-view overlapping region to obtain a right-view overlapping corrected image;

wherein the image fusion of the third corrected left-view image and the third corrected right-view image by the central processing unit to obtain the fused image comprises: fusing the left-view overlapping corrected image and the right-view overlapping corrected image to obtain an overlapping fused image; and combining the left-view non-overlapping region, the overlapping fused image and the right-view non-overlapping region to obtain the fused image.

9. The image processing method of claim 8, further comprising:

calibrating the binocular camera to obtain calibration parameters, and generating a second left-view horizontal correction lookup table, a second right-view horizontal correction lookup table, an image fusion lookup table, and an overlapping region lookup table based on the calibration parameters;

the horizontal correcting of the second corrected left-view image and the second corrected right-view image by the central processing unit to obtain the third corrected left-view image and the third corrected right-view image comprises: dividing, based on the overlapping region lookup table, the second corrected left-view image into the left-view overlapping region and the left-view non-overlapping region; dividing, based on the overlapping region lookup table, the second corrected right-view image into the right-view overlapping region and the right-view non-overlapping region; horizontally correcting, based on the second left-view horizontal correction lookup table, the left-view overlapping region to obtain the left-view overlapping corrected image; and horizontally correcting, based on the second right-view horizontal correction lookup table, the right-view overlapping region to obtain the right-view overlapping corrected image;

wherein the fusing of the left-view overlapping corrected image and the right-view overlapping corrected image to obtain the overlapping fused image comprises: fusing, based on the image fusion lookup table, the left-view overlapping corrected image and the right-view overlapping corrected image to obtain the overlapping fused image.

10. The image processing method of claim 1, further comprising:

encoding the stitched image to obtain an encoded stitched image, and transmitting the encoded stitched image based on RTSP protocols.

11. An image processing device, comprising:

an image signal processor, configured to acquire images to be processed based on captured images;

a horizontal distortion correction module, configured to correct the images to be processed in a horizontal direction to obtain first corrected images;

a first rotation module, configured to rotate the first corrected images by 90 degrees along a first direction to obtain second corrected images;

a central processing unit, configured to correct the second corrected images in the horizontal direction to obtain third corrected images and to perform an image fusion on the third corrected images to obtain a fused image; and a second rotation module, configured to rotate the fused image by 90 degrees along a second direction opposite to the first direction to obtain a stitched image.

12. The image processing device of claim 11, wherein the image signal processor is configured to receive a left-view image and a right-view image provided from a binocular camera, and adjust the left-view image and the right-view image to obtain the images to be processed comprising an adjusted left-view image and an adjusted right-view image;

the horizontal distortion correction module is configured to horizontally correct the adjusted left-view image and the adjusted right-view image to obtain a first corrected left-view image and a first corrected right-view image;

the first rotation module is configured to perform a positive rotation of 90 degrees on the first corrected left-view image and the first corrected right-view image to obtain a second corrected left-view image and a second corrected right-view image;

the central processing unit is configured to horizontally correct the second corrected left-view image and the second corrected right-view image to obtain a third corrected left-view image and a third corrected right-view image, and fuse the third corrected left-view image and the third corrected right-view image to obtain the fused image; and the second rotation module is configured to perform an inverse rotation of 90 degrees on the fused image, and then scale and crop the fused image to obtain the stitched image.

13. The image processing device of claim 12, wherein the image signal processor is configured to:
   receive the left-view image and the right-view image from the binocular camera; and
   adjust brightnesses, colors, and exposures of the left-view image and the right-view image, respectively, so that the brightnesses, the colors, and the exposures of the left-view image and the right-view image are close to each other.

14. The image processing device of claim 12, wherein the horizontal distortion correction module is configured to:
   sequentially fetch and correct, along a row direction, the adjusted left-view image to obtain the first corrected left-view image; and
   sequentially fetch and correct, along the row direction, the adjusted right-view image to obtain the first corrected right-view image.

15. The image processing device of claim 12, further comprising:
   a calibration module, configured to calibrate the binocular camera to obtain calibration parameters, and generate a first left-view horizontal correction lookup table and a first right-view horizontal correction lookup table based on the calibration parameters,
   wherein the horizontal distortion correction module is configured to: horizontally correct the adjusted left-view image based on the first left-view horizontal correction lookup table; and horizontally correct the adjusted right-view image based on the first right-view horizontal correction lookup table.

16. The image processing device of claim 12, wherein the central processing unit is configured to:
   sequentially fetch and correct, along a row direction, the second corrected left-view image to obtain the third corrected left-view image;
   sequentially fetch and correct, along the row direction, the second corrected right-view image to obtain the third corrected right-view image;
   divide the third corrected left-view image into a left-view overlapping region and a left-view non-overlapping region;
   divide the third corrected right-view image into a right-view overlapping region and a right-view non-overlapping region;
   fuse the left-view overlapping region and the right-view overlapping region to obtain an overlapping fused image; and
   combine the left-view non-overlapping region, the overlapping fused image and the right-view non-overlapping region to obtain the fused image.

17. The image processing device of claim 16, further comprising:
   a calibration module, configured to calibrate the binocular camera to obtain calibration parameters, and generate a second left-view horizontal correction lookup table, a second right-view horizontal correction lookup table, an image fusion lookup table, and an overlapping region lookup table based on the calibration parameters;
   wherein the central processing unit is configured to: horizontally correct, based on the second left-view horizontal correction lookup table, the second corrected left-view image to obtain the third corrected left-view image; horizontally correct, based on the second right-view horizontal correction lookup table, the second corrected right-view image to obtain the third corrected right-view image; divide, based on the overlapping region lookup table, the third corrected left-view image into the left-view overlapping region and the left-view non-overlapping region; divide, based on the overlapping region lookup table, the third corrected right-view image into the right-view overlapping region and the right-view non-overlapping region; and fuse, based on the image fusion lookup table, the left-view overlapping region and the right-view overlapping region to obtain the overlapping fused image.

18. The image processing device of claim 12, wherein the central processing unit is configured to:
   divide the second corrected left-view image into a left-view overlapping region and a left-view non-overlapping region;
   divide the second corrected right-view image into a right-view overlapping region and a right-view non-overlapping region;
   sequentially fetch and correct, along a row direction, the left-view overlapping region to obtain a left-view overlapping corrected image;
   sequentially fetch and correct, along the row direction, the right-view overlapping region to obtain a right-view overlapping corrected image;
   fuse the left-view overlapping corrected image and the right-view overlapping corrected image to obtain an overlapping fused image; and
   combine the left-view non-overlapping region, the overlapping fused image and the right-view non-overlapping region to obtain the fused image.

19. The image processing device of claim 18, further comprising:
   a calibration module, configured to calibrate the binocular camera to obtain calibration parameters, and generate a second left-view horizontal correction lookup table, a second right-view horizontal correction lookup table, an image fusion lookup table, and an overlapping region lookup table based on the calibration parameters;
   wherein the central processing unit is configured to: divide, based on the overlapping region lookup table, the second corrected left-view image into the left-view overlapping region and the left-view non-overlapping region; divide, based on the overlapping region lookup table, the second corrected right-view image into the right-view overlapping region and the right-view non-overlapping region; horizontally correct, based on the second left-view horizontal correction lookup table, the left-view overlapping region to obtain the left-view overlapping corrected image; horizontally correct, based on the second right-view horizontal correction lookup table, the right-view overlapping region to obtain the right-view overlapping corrected image; and fuse, based on the image fusion lookup table, the left-view overlapping corrected image and the right-view overlapping corrected image to obtain the overlapping fused image.

20. The image processing device of claim 11, further comprising:
   an encoding module, configured to encode the stitched image to obtain an encoded stitched image, and transmit the encoded stitched image based on RTSP protocols.

21. An electronic device, comprising:
a memory, configured to store a processor-executable program; and
a processor, configured to execute the program to cause the electronic device to:
  acquire images to be processed based on captured images;
  correct the images to be processed in a horizontal direction to obtain first corrected images;
  rotate the first corrected images by 90 degrees along a first direction to obtain second corrected images;
  correct the second corrected images in the horizontal direction to obtain third corrected images;
  perform an image fusion on the third corrected images to obtain a fused image; and
  rotate the fused image by 90 degrees along a second direction opposite to the first direction to obtain a stitched image.

* * * * *